Patented June 24, 1952

2,601,469

UNITED STATES PATENT OFFICE 2,601,469

PROCESS OF STABILIZING CALCIUM LITHOL TONERS

Volney Tullsen, Westfield, and Frederick L. Pfeiffer, Chatham, N. J., assignors to American Cyanamid Company, New York, N. Y., a corporation of Maine No Drawing. Application September 30, 1950, Serial No. 187,835

1 Claim. (Cl. 260—195)

This invention relates to new processes of producing calcium lithol toners.

One of the most important recent developments in the printing ink field has been the introduction of so-called vapor setting inks, which dry by precipitation on contact with moisture. These inks are formulated with a high-boiling water-soluble vehicle, such as diethylene glycol, and special synthetic resins which are soluble in the vehicle but lose their solubility when the solvent is diluted with water. The inks are printed in the usual manner, and then exposed to steam, water vapor, or (in some cases) simply to the ordinary moisture of the atmosphere. The resulting dilution of the vehicle causes precipitation and setting.

These inks offer striking practical advantages, including cleanness and brilliance of color, freedom from odor, and fast setting, and consequently have found widespread use in a number of important applications. Nevertheless their adoption has been hindered by the serious drawback that certain of the most important known pigments have not proved well suited for use in vapor setting formulations, but create serious practical difficulties when such use is attempted.

One of the most important types of pigments are the so-called lithol toners, which are prepared by diazotizing Tobias acid (2-naphthylamine-1-sulfonic acid) and coupling with beta-naphthol. For shading purposes, the Tobias acid is frequently mixed with a portion of another amino sulfonic acid, such as 1-naphthylamine-2-sulfonic acid. These colors are usually employed in the form of their alkaline earth metal lakes. Unfortunately when these lakes are incorporated in vapor setting inks, they exhibit a serious color instability and also show a strong tendency to cause the ink to "body," or gain in viscosity. For example, barium lithols shift color from the desired bright red to a dull orange shade, and the ink increases in viscosity until it becomes useless and is practically semi-solid.

The calcium lakes are somewhat less unstable than the barium and strontium lakes, but they are still sufficiently unstable to present a serious problem which has interfered with their use in vapor setting inks.

According to the present invention it has been found that the calcium lakes may be transformed into stable compounds by relatively simple processes. The change in the characteristics of the lakes when subjected to the processes of the present invention is a very real one and it probably is a change in physical form. However, this change can not be shown on X-ray diffraction measurements.

Throughout the specification and claims the term "lithol toners" will be used to denote lakes of the azo dyes obtained by coupling beta-naphthol with a diazo compound having diazotized Tobias acid as its major constituent.

The processes of the present invention comprise essentially heating the unstable calcium lithol toners with formamide. The process starts when the temperature is raised above room temperature, but is too slow for economical practical use below 50° C. At higher temperatures the change is more rapid, but of coarse, the temperature must be kept below that at which either the solvent or the pigment starts to decompose.

It is another advantage of the present invention that the amount of formamide is not critical. Of course, it is necessary to use sufficient formamide to thoroughly wet the pigment. Somewhat larger amounts of formamide, for example, an amount equal to the weight of the pigment, would give better operating conditions since it would permit stirring which, though not essential, is desirable. Larger amounts of formamide do no harm but as they do not improve the results they are normally not desirable as excessively large amounts will increase the cost of operation.

For some purposes, however, it is desirable to market a dry pigment, and this may be accomplished easily by filtering the pigment after stabilization, washing it with water, and drying. It is an advantage of the present invention that once stabilized the lithol toner can be kept indefinitely without losing its desirable properties.

The invention will be described in greater detail in conjunction with the following specific example. The parts are by weight.

*Example*

30 parts of calcium lithol toner are heated at 85° C. for ninety hours in 65 parts of formamide. The slurry is then thoroughly stirred with 250 parts of water, filtered, washed thoroughly, and dried. The pigment thus obtained gives vapor setting inks of excellent stability on storage.

If an ink is prepared with the same ingredients but without heating the lithol toner in formamide, its color shifts to a blue shade on storage and serious bodying takes place.

This application is in part a continuation of our application, Serial No. 118,178, filed September 27, 1949.

We claim:

A process of transforming an unstable calcium lithol toner into a stable form which comprises heating the toner in formamide at a temperature ranging from slightly above room temperature to below the decomposition point of the toner until transformation into the stable form is substantially complete.

VOLNEY TULLSEN.
FREDERICK L. PFEIFFER.

REFERENCES CITED

The following references are of record in the file of this patent:

UNITED STATES PATENTS

| Number | Name | Date |
|---|---|---|
| 2,028,959 | Todd et al. | Jan. 28, 1936 |
| 2,174,501 | Reich | Sept. 26, 1939 |
| 2,435,769 | Cheyney et al. | Feb. 10, 1948 |
| 2,447,394 | Candee | Aug. 17, 1948 |